(12) United States Patent
Nakagawa

(10) Patent No.: US 11,340,500 B2
(45) Date of Patent: May 24, 2022

(54) LIQUID CRYSTAL DISPLAY DEVICE

(71) Applicant: Panasonic Liquid Crystal Display Co., Ltd., Hyogo (JP)

(72) Inventor: Teruhisa Nakagawa, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 120 days.

(21) Appl. No.: 16/776,044

(22) Filed: Jan. 29, 2020

(65) Prior Publication Data

US 2020/0310174 A1  Oct. 1, 2020

(30) Foreign Application Priority Data

Mar. 28, 2019 (JP) .............................. JP2019-063284

(51) Int. Cl.
*G02F 1/1368* (2006.01)
*G02F 1/1339* (2006.01)
*G02F 1/1362* (2006.01)

(52) U.S. Cl.
CPC .......... *G02F 1/1339* (2013.01); *G02F 1/1368* (2013.01); *G02F 1/136209* (2013.01); *G02F 1/136286* (2013.01); *G02F 2201/123* (2013.01)

(58) Field of Classification Search
CPC ........... G02F 1/136286; G02F 1/13394; G02F 1/1368; G02F 1/136209; G02F 1/1339; G02F 1/1335; G02F 1/133512; G02F 1/13452; G02F 1/1362; G02F 1/1343; G02F 1/134309; G02F 2201/123; G02F 2201/40
See application file for complete search history.

(56) References Cited

U.S. PATENT DOCUMENTS

2010/0118221 A1* 5/2010 Kim .................. G02F 1/136286
349/39
2014/0347586 A1* 11/2014 Wang .................. G02F 1/13394
349/43

FOREIGN PATENT DOCUMENTS

JP  2014-38125  2/2014

* cited by examiner

*Primary Examiner* — Thoi V Duong
(74) *Attorney, Agent, or Firm* — Wenderoth, Lind & Ponack, L.L.P.

(57) ABSTRACT

A liquid crystal display device, comprising: a first substrate; a second substrate disposed opposite to the first substrate; a liquid crystal layer; and a spacer, wherein the first substrate includes a first pixel row, a second pixel row, a first source line and a second source line that extend in the second direction, a first gate line that extends in the first direction between the first pixel row and the second pixel row, a first thin film transistor to which the first source line, and the first gate line are electrically connected, and a second thin film transistor to which the second source line, and the first gate line are electrically connected, and the spacer is disposed so as to overlap with at least a portion of the first thin film transistor and at least a portion of the second thin film transistor in plan view.

7 Claims, 5 Drawing Sheets

LIQUID CRYSTAL DISPLAY DEVICE

CROSS-REFERENCE TO RELATED APPLICATION

This application claims priority from Japanese application JP 2019-063284, filed Mar. 28, 2019. This Japanese application is incorporated herein by reference.

BACKGROUND

Field of the Invention

The present invention relates to a liquid crystal display device.

Background Art

A liquid crystal display device described in JP-A-2014-038125 includes a plurality of gate lines extending in a first direction and a plurality of source lines extending in a second direction that crosses the first direction. A pixel electrode is disposed in a region surrounded by two adjacent gate lines and two adjacent source lines, and a plurality of pixel electrodes are arranged in the first direction and the second direction. A spacer is disposed in the region where the gate line and the source line cross in order to constantly maintain the space between a thin film transistor substrate and a color filter substrate.

SUMMARY OF THE INVENTION

One problem with the configuration disclosed in JP-A-2014-038125 is that the aperture ratio decreases depending on the size of the spacer. Specifically, with the conventional configuration described above, the spacer must have an area of a certain size when viewed from above in order to ensure the strength and the like of the spacer. However, increasing the area of the spacer when viewed from above necessitates increasing the area of a black matrix that is disposed so as to overlap with the spacer when viewed from above, which leads to a decrease of the aperture ratio.

In light of the problem described above, an object of the present disclosure is to suppress a decrease of the aperture ratio of a liquid crystal display device that includes a spacer.

A liquid crystal display device according to the present disclosure includes a first substrate; a second substrate disposed so as to face the first substrate; a liquid crystal layer disposed between the first substrate and the second substrate; and a spacer maintaining a gap between the first substrate and the second substrate, wherein the first substrate includes a first pixel row including a first pixel electrode and a second pixel electrode that are arranged in a first direction, a second pixel row including a third pixel electrode and a fourth pixel electrode that are arranged in the first direction, the second pixel row being adjacent to the first pixel row in a second direction that crosses the first direction, a first source line and a second source line that extend in the second direction between the first pixel electrode and the second pixel electrode, and between the third pixel electrode and the fourth pixel electrode, a first gate line that extends in the first direction between the first pixel row and the second pixel row, a first thin film transistor to which the first source line, the first gate line, and the first pixel electrode are electrically connected, and a second thin film transistor to which the second source line, the first gate line, and the second pixel electrode are electrically connected, and the spacer is disposed so as to overlap with at least a portion of the first thin film transistor and at least a portion of the second thin film transistor when viewed from above.

With the liquid crystal display device according to the present disclosure, it is possible to suppress a decrease of the aperture ratio.

DETAILED DESCRIPTION OF THE INVENTION

Next, a first exemplary embodiment of the present disclosure will be described while referencing the drawings. In the present embodiment, a description is given in which a first substrate is a thin film transistor substrate, and a second substrate opposite to the first substrate is a counter substrate.

First Exemplary Embodiment

Figure 1:
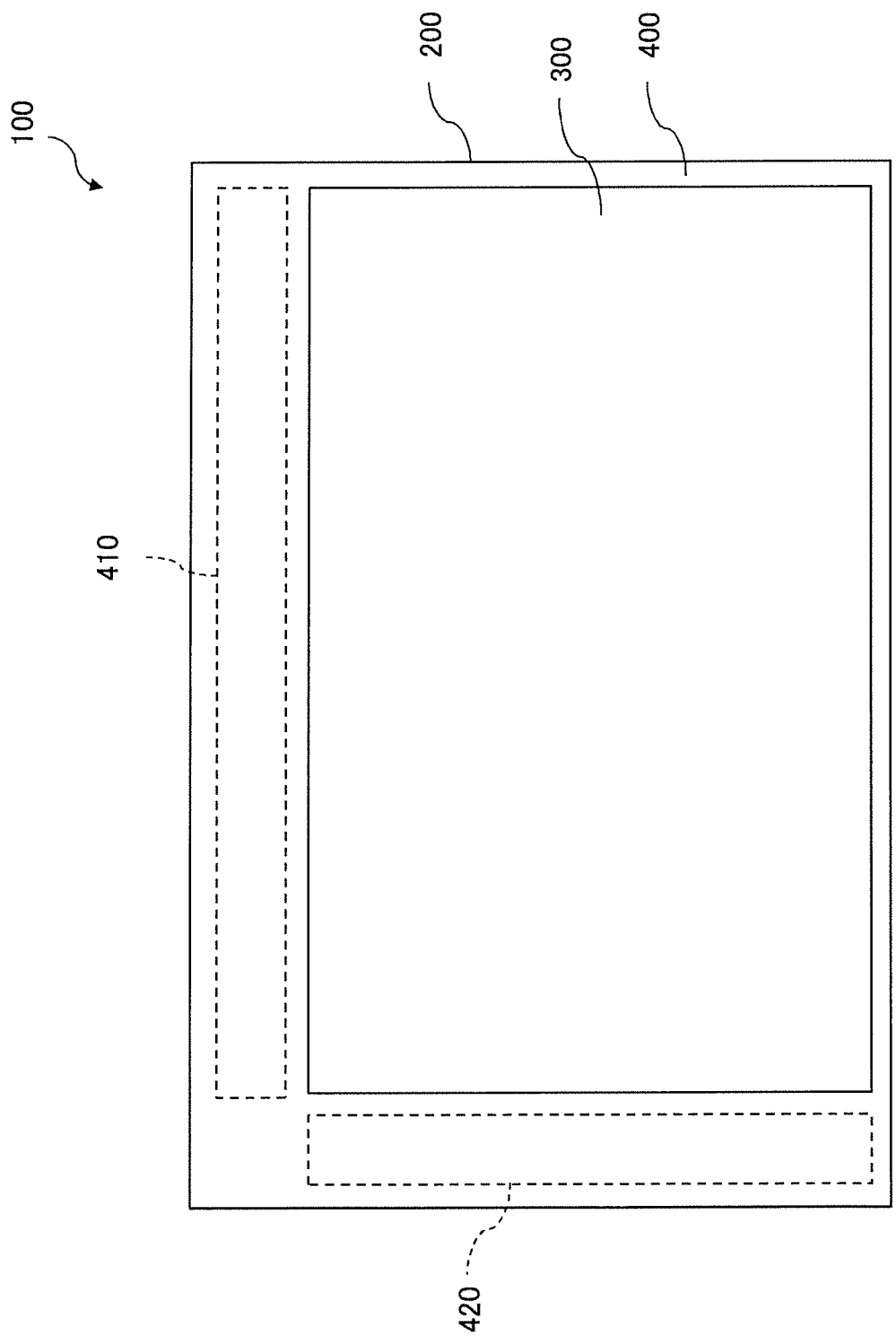
FIG. 1 is a plan view illustrating a schematic configuration of a liquid crystal display device according to a first exemplary embodiment.

FIG. 1 is a plan view illustrating a schematic configuration of a liquid crystal display device 100 according to the first exemplary embodiment. The liquid crystal display device 100 mainly includes a display panel 200 and a back light (not illustrated in the drawings) disposed on the back surface side of the display panel 200. Roughly divided by region, the display panel 200 includes a display region 300 in which images are displayed, and a frame region 400 positioned on the outer periphery of the display region 300.

A source driver 410 that supplies source signals to a plurality of source lines is disposed on one side of the frame region 400, and a gate driver 420 that supplies gate signals to a plurality of gate lines is disposed on another side of the frame region 400. Note that, in the present embodiment, an example of a configuration is described in which the source driver 410 and the gate driver 420 are disposed on two sides that extend in directions that cross each other. However, a configuration is possible in which the side on which the source driver 410 is disposed and the side on which the gate driver 420 is disposed face each other. In addition, a configuration is possible in which the source driver 410 and the gate driver 420 are disposed on the same side.

Figure 2:
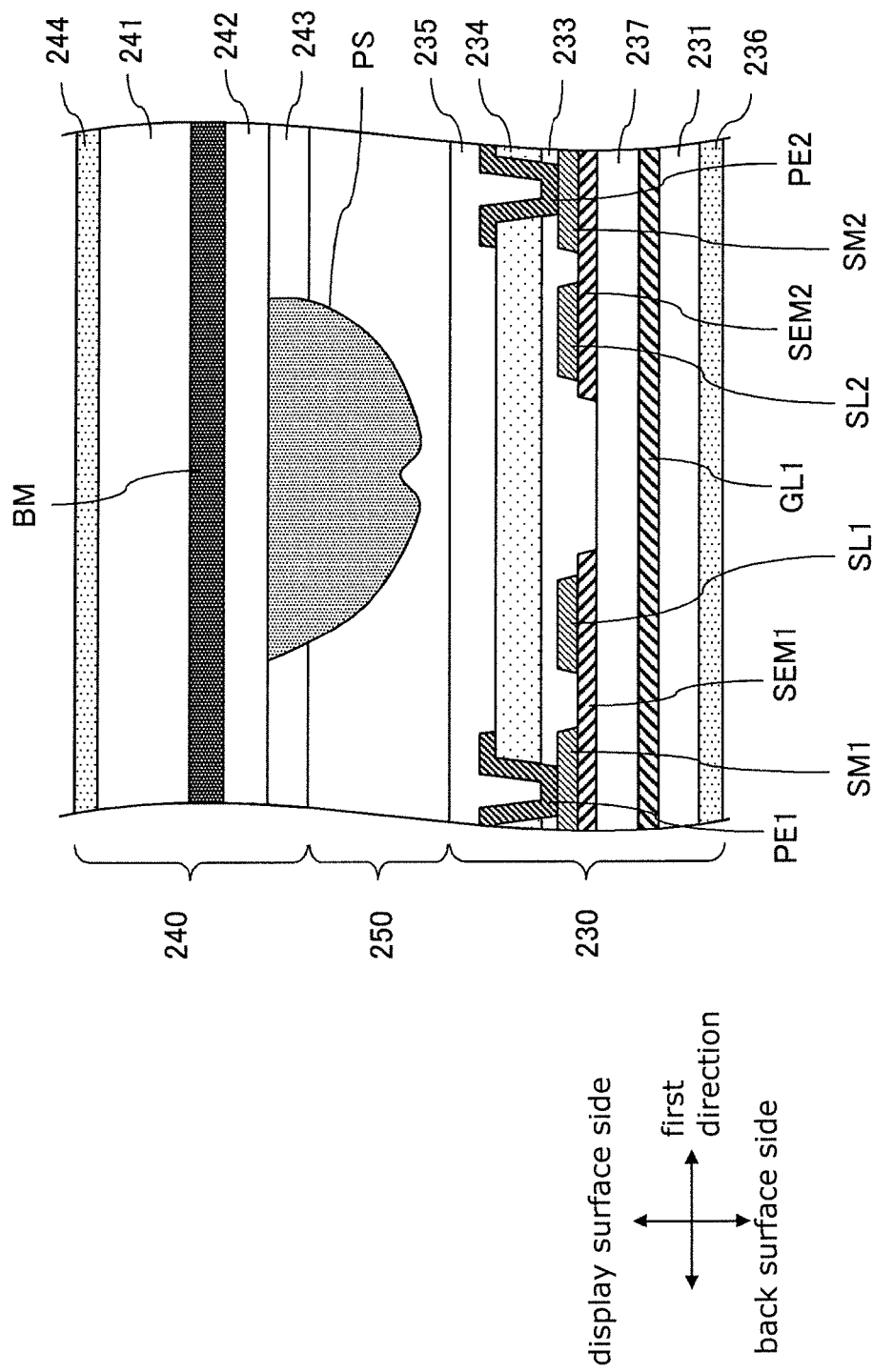
FIG. 2 is a schematic cross-sectional view illustrating the disposal of a spacer of the liquid crystal display device according to a first exemplary embodiment.

FIG. 2 is a schematic cross-sectional view illustrating the disposal of a spacer PS in the liquid crystal display device 100 according to the first exemplary embodiment. In the present embodiment, the liquid crystal display device 100 includes a thin film transistor substrate 230 that is a first substrate, and a counter substrate 240 that is opposite to the thin film transistor substrate 230; and a liquid crystal layer 250 is disposed between the thin film transistor substrate 230 and the counter substrate 240. A plurality of spacers PS that project to the thin film transistor substrate 230 side are provided on the back surface side of the counter substrate 240. The spacers PS fulfill the role of maintaining gaps between the thin film transistor substrate 230 and the counter substrate 240 within a display surface. The spacers PS can be formed from an insulating film made from, for example, resin or the like. The cross-sectional structure illustrated in FIG. 2 will be described in detail later.

Figure 3:
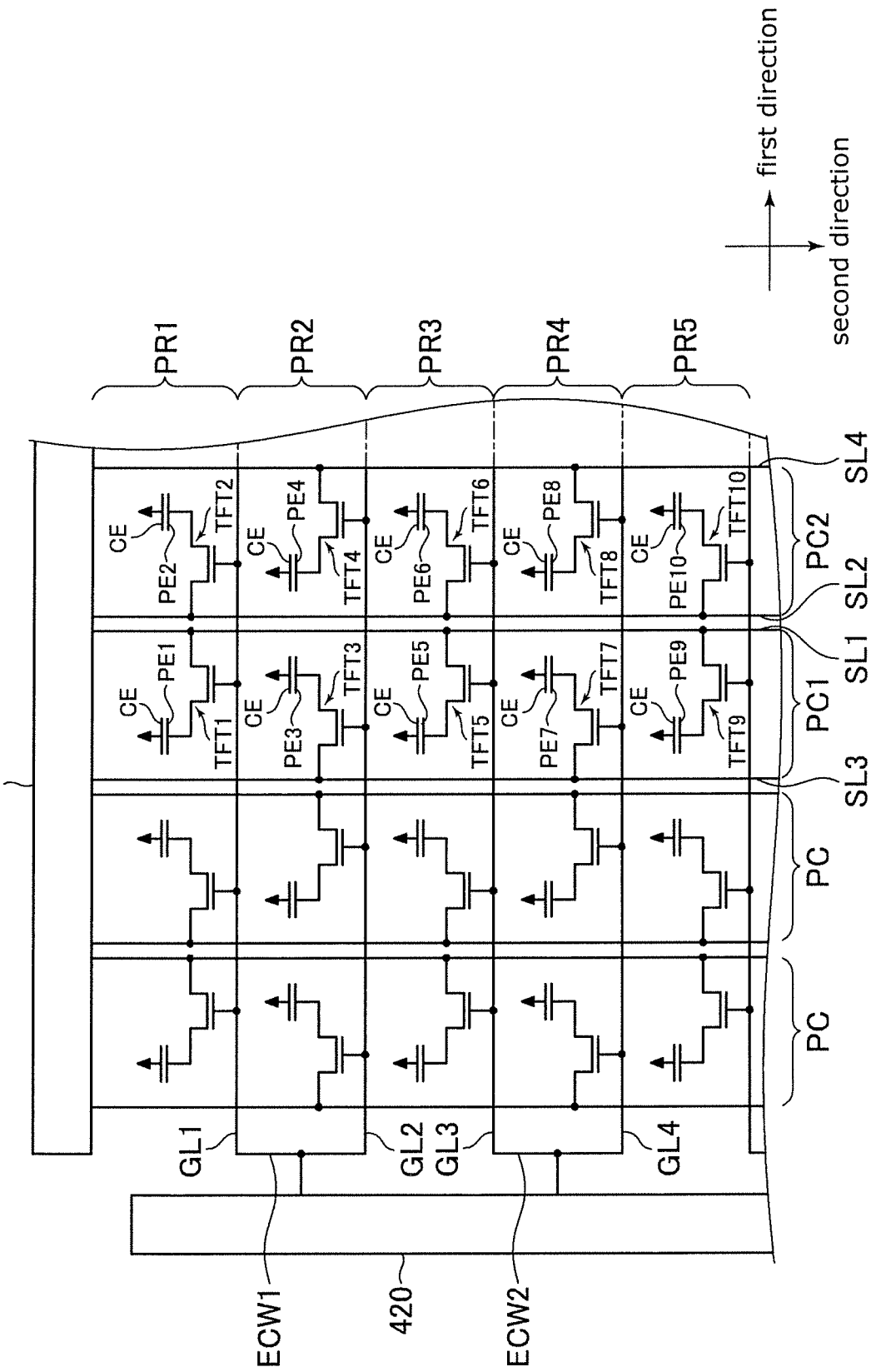
FIG. 3 is a circuit diagram illustrating a schematic configuration of a pixel region of a display panel according to a first exemplary embodiment.

FIG. 3 is a circuit diagram illustrating a schematic configuration of a pixel region of the display panel 200 according to the present embodiment. As illustrated in FIG. 3, the thin film transistor substrate 230 of the liquid crystal display device 100 includes a plurality of gate lines GL (GL1, GL2, GL3, GL4, and the like), and the gate driver 420 that supplies gate signals to each of the gate lines GL. Each of the gate lines GL is connected to the gate driver 420 and extends in a first direction. Specifically, the plurality of gate lines GL are disposed at substantially equal intervals in a second direction that crosses the first direction, and extend in the first direction so as to traverse between a plurality of pixels.

As illustrated in FIG. 3, the liquid crystal display device 100 includes a plurality of source lines SL (SL1, SL2, SL3, SL4, and the like), and the source driver 410 that supplies source signals to each of the source lines SL. Each of the source lines SL is connected to the source driver 410 and extends in the second direction so as to traverse between a plurality of pixels. Specifically, two of the source lines SL extend in the second direction between the pixels.

A plurality of pixel regions partitioned by the plurality of gate lines GL and the plurality of source lines SL are disposed in a matrix manner in the display region 300 of the display panel 200. As illustrated in FIG. 3, the display panel 200 includes a plurality of pixel electrodes PE (PE1, PE2, PE3, PE4, PE5, PE6, PE7, PE8, PE9, PE10, and the like) formed in the plurality of pixel regions, common electrodes CE that correspond to the plurality of pixel electrodes PE, and a plurality of thin film transistors TFT (TFT1, TFT2, TFT3, TFT4, TFT5, TFT6, TFT7, TFT8, TFT9, TFT10, and the like) formed near the intersection of each gate line GL and each source line SL. Common potential is supplied to the common electrodes CE.

As illustrated in FIG. 3, a group of the plurality of pixel electrodes PE arranged in the first direction forms a pixel row PR (PR1, PR2, PR3, PR4, PR5, and the like). In the present embodiment, a pixel row including the first pixel electrode PE1 and the second pixel electrode PE2 that are arranged in the first direction is defined as a first pixel row PR1, a pixel row including the third pixel electrode PE3 and the fourth pixel electrode PE4 that are arranged in the first direction is defined as a second pixel row PR2, a pixel row including the fifth pixel electrode PE5 and the sixth pixel electrode PE6 that are arranged in the first direction is defined as a third pixel row PR3, a pixel row including the seventh pixel electrode PE7 and the eighth pixel electrode PE8 that are arranged in the first direction is defined as a fourth pixel row PR4, and a pixel row including the ninth pixel electrode PE9 and the tenth pixel electrode PE10 that are arranged in the first direction is defined as a fifth pixel row PR5. The first pixel row PR1, the second pixel row PR2, the third pixel row PR3, the fourth pixel row PR4, and the fifth pixel row PR5 are disposed in this order in the second direction. As such, the second pixel row PR2 is adjacent to the first pixel row PR1 in the second direction, the third pixel row PR3 is adjacent to the second pixel row PR2 in the second direction, the fourth pixel row PR4 is adjacent to the third pixel row PR3 in the second direction, and the fifth pixel row PR5 is adjacent to the fourth pixel row PR4 in the second direction.

As illustrated in FIG. 3, a group of the plurality of pixel electrodes PE arranged in the second direction forms a pixel column PC (PC1, PC2, and the like). In the present embodiment, a pixel column including the first pixel electrode PE1, the third pixel electrode PE3, the fifth pixel electrode PE5, the seventh pixel electrode PE7, and the ninth pixel electrode PE9 arranged in the second direction is defined as a first pixel column PC1, and a pixel column including the second pixel electrode PE2, the fourth pixel electrode PE4, the sixth pixel electrode PE6, the eighth pixel electrode PE8, and the tenth pixel electrode PE10 arranged in the second direction is defined as a second pixel column PC2. The first pixel column PC1 and the second pixel column PC2 are adjacent in the first direction.

The first source line SL1 and the second source line SL2 extend in the second direction between the first pixel column PC1 and the second pixel column PC2. Specifically, the first source line SL1 and the second source line SL2 extend in the second direction between the first pixel electrode PE1 and the second pixel electrode PE2, between the third pixel electrode PE3 and the fourth pixel electrode PE4, between the fifth pixel electrode PE5 and the sixth pixel electrode PE6, between the seventh pixel electrode PE7 and the eighth pixel electrode PE8, and between the ninth pixel electrode PE9 and the tenth pixel electrode PE10. The first source line SL1 is disposed at a position closer to the first pixel column PC1 than the second source line SL2, and the second source line SL2 is disposed at a position closer to the second pixel column PC2 than the first source line SL1. Specifically, the first source line SL1 is disposed at a position closer to the first pixel electrode PE1 than the second source line SL2, and the second source line SL2 is disposed at a position closer to the second pixel electrode PE2 than the first source line SL1.

The first pixel electrode PE1, the fifth pixel electrode PE5, and the ninth pixel electrode PE9 are electrically connected to the first source line SL1 via the first thin film transistor TFT1, the fifth thin film transistor TFT5, and the ninth thin film transistor TFT9, respectively. The second pixel electrode PE2, the sixth pixel electrode PE6, and the tenth pixel electrode PE10 are electrically connected to the second source line SL2 via the second thin film transistor TFT2, the sixth thin film transistor TFT6, and the tenth thin film transistor TFT10, respectively.

The third source line SL3 extending in the second direction is disposed on the left side of the first pixel column PC1, and the third source line SL3 is disposed so that the third source line SL3 and the first source line SL1 sandwich the first pixel column PC1. The third pixel electrode PE3 and the seventh pixel electrode PE7 are electrically connected to the third source line SL3 via the third thin film transistor TFT3 and the seventh thin film transistor TFT7, respectively.

The fourth source line SL4 extending in the second direction is disposed on the right side of the second pixel column PC2, and the fourth source line SL4 is disposed so that the fourth source line SL4 and the second source line SL2 sandwich the second pixel column PC2. The fourth pixel electrode PE4 and the eighth pixel electrode PE8 are electrically connected to the fourth source line SL4 via the fourth thin film transistor TFT4 and the eighth thin film transistor TFT8, respectively.

The first gate line GL1 extends in the first direction between the first pixel row PR1 and the second pixel row PR2, that is, between the first pixel electrode PE1 and the third pixel electrode PE3, and between the second pixel electrode PE2 and the fourth pixel electrode PE4. The second gate line GL2 extends in the first direction between the second pixel row PR2 and the third pixel row PR3, that is, between the third pixel electrode PE3 and the fifth pixel electrode PE5, and between the fourth pixel electrode PE4 and the sixth pixel electrode PE6. The third gate line GL3 extends in the first direction between the third pixel row PR3 and the fourth pixel row PR4, that is, between the fifth pixel electrode PE5 and the seventh pixel electrode PE7, and between the sixth pixel electrode PE6 and the eighth pixel electrode PE8. The fourth gate line GL4 extends in the first direction between the fourth pixel row PR4 and the fifth pixel row PR5, that is, between the seventh pixel electrode PE7 and the ninth pixel electrode PE9, and between the eighth pixel electrode PE8 and the tenth pixel electrode PE10.

The first pixel electrode PE1 and the second pixel electrode PE2 are electrically connected to the first gate line GL1 via the first thin film transistor TFT1 and the second thin film transistor TFT2, respectively. The first thin film transistor TFT1 is electrically connected to the first source line SL1, the first gate line GL1, and the first pixel electrode PE1. The second thin film transistor TFT2 is electrically connected to the second source line SL2, the first gate line GL1, and the second pixel electrode PE2.

The third pixel electrode PE3 and the fourth pixel electrode PE4 are electrically connected to the second gate line GL2 via the third thin film transistor TFT3 and the fourth thin film transistor TFT4, respectively. The third thin film transistor TFT3 is electrically connected to the third source line SL3, the second gate line GL2, and the third pixel electrode PE3. The fourth thin film transistor TFT4 is electrically connected to the fourth source line SL4, the second gate line GL2, and the fourth pixel electrode PE4.

The fifth pixel electrode PE5 and the sixth pixel electrode PE6 are electrically connected to the third gate line GL3 via the fifth thin film transistor TFT5 and the sixth thin film transistor TFT6, respectively. The fifth thin film transistor TFT5 is electrically connected to the first source line SL1, the third gate line GL3, and the fifth pixel electrode PE5. The sixth thin film transistor TFT6 is electrically connected to the second source line SL2, the third gate line GL3, and the sixth pixel electrode PE6.

The seventh pixel electrode PE7 and the eighth pixel electrode PE8 are electrically connected to the fourth gate line GL4 via the seventh thin film transistor TFT7 and the eighth thin film transistor TFT8, respectively. The seventh thin film transistor TFT7 is electrically connected to the third source line SL3, the fourth gate line GL4, and the seventh pixel electrode PE7. The eighth thin film transistor TFT8 is electrically connected to the fourth source line SL4, the fourth gate line GL4, and the eighth pixel electrode PE8.

At the end of the second pixel row PR2, the first gate line GL1 and the second gate line GL2 are connected to each other by a first end connection wiring ECW1, and a common gate signal is supplied to the gate lines GL1 and GL2 via the first end connection wiring ECW1 from the gate driver 420. Likewise, at the end of the fourth pixel row PR4, the third gate line GL3 and the fourth gate line GL4 are connected by a second end connection wiring ECW2, and a common gate signal is supplied to the gate lines GL3 and GL4 via the second end connection wiring ECW2 from the gate driver 420.

Due to this configuration, it is possible to reproduce the desired brightness at each pixel, even in high-definition and large-screen display devices. Typically, in high-definition display devices, the write time for supplying a gate signal to one gate line GL is short. That is, the pulse width of the gate signal is short. In addition, in large-screen display devices, sufficient writing may not be possible due to the delay resulting from increased gate resistance and capacitance. A solution to these problems is to adopt a configuration, such as that described above, in which a common gate signal is input into two of the gate lines GL. With such a configuration, it is possible to double the write time and double the pulse width of the gate signal. As a result, it is possible to reproduce the desired brightness at each pixel, even in high-definition and large-screen display devices.

Figure 4:
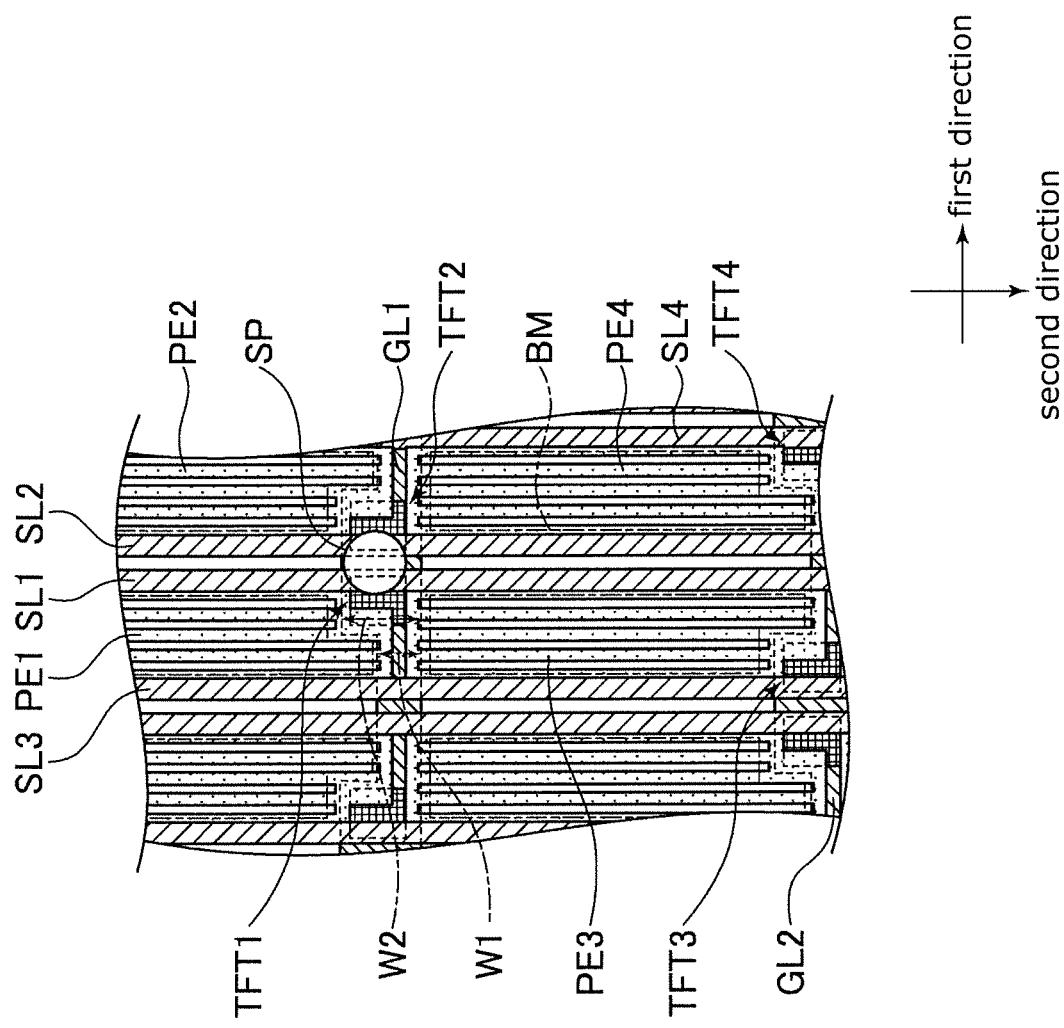
FIG. 4 is a schematic plan view illustrating the arrangement relationship between pixel electrodes and the spacer according to a first exemplary embodiment.

FIG. 4 is a schematic plan view illustrating the arrangement relationship between the pixel electrodes and the spacer according to the present embodiment. As illustrated in FIG. 4, the first gate line GL1 is disposed that extends in the first direction between the first pixel electrode PE1 and the third pixel electrode PE3, and between the second pixel electrode PE2 and the fourth pixel electrode PE4. In addition, the first source line SL1 and the second source line SL2 are provided that extend in the second direction between the first pixel electrode PE1 and the second pixel electrode PE2, and between the third pixel electrode PE3 and the fourth pixel electrode PE4.

As illustrated in FIG. 4, the first gate line GL1, the first source line SL1, and the first pixel electrode PE1 are electrically connected to the first thin film transistor TFT1. The first gate line GL1, the second source line SL2, and the second pixel electrode PE2 are electrically connected to the second thin film transistor TFT2.

Moreover, as illustrated in FIG. 4, the spacer PS that was described using FIG. 2 is disposed so as to overlap with at least a portion of the first thin film transistor TFT1 and at least a portion of the second thin film transistor TFT2 when viewed from above, that is in plan view.

In the example illustrated in FIG. 4, a black matrix BM is disposed so as to be overlapped between two of the pixel electrodes PE that are adjacent in the first direction and between two of the pixel electrodes PE that are adjacent in the second direction when viewed from above. Moreover, the black matrix BM is disposed so as to overlap with the first thin film transistor TFT1, the second thin film transistor TFT2, and the spacer PS when viewed from above.

As a result of this configuration, it is possible to consolidate the disposal positions of the first thin film transistor TFT1 and the second thin film transistor TFT2 in the region where the first gate line GL1, and the first source line SL1 and the second source line SL2 cross. The positions at which the first thin film transistor TFT1 and the second thin film transistor TFT2 are disposed do not affect the aperture ratio. As such, by disposing the spacer PS so as to straddle the positions at which the first thin film transistor TFT1 and the second thin film transistor TFT2 are disposed, reduction of the aperture ratio can be suppressed and, at the same time, a spacer PS with a size sufficient to straddle the positions at which the first thin film transistor TFT1 and the second thin film transistor TFT2 are disposed can be provided, and display inconsistencies can be suppressed.

As illustrated in FIG. 4, the first gate line GL1 has a first width W1 in the second direction in a region, between the first pixel electrode PE1 and the third pixel electrode PE3, that does not overlap with the first thin film transistor TFT1 when viewed from above. Moreover, the first gate line GL1 has a width in the second direction (for example, a second width W2) that is larger than the first width W1 in a region that overlaps with the first thin film transistor TFT1 and the second thin film transistor TFT2 when viewed from above.

Due to this configuration, it is possible to lower the resistance of the first gate line GL1. The reasons for this will be explained by comparing the configuration described above with the reference example illustrated in FIG. 5.

Figure 5:
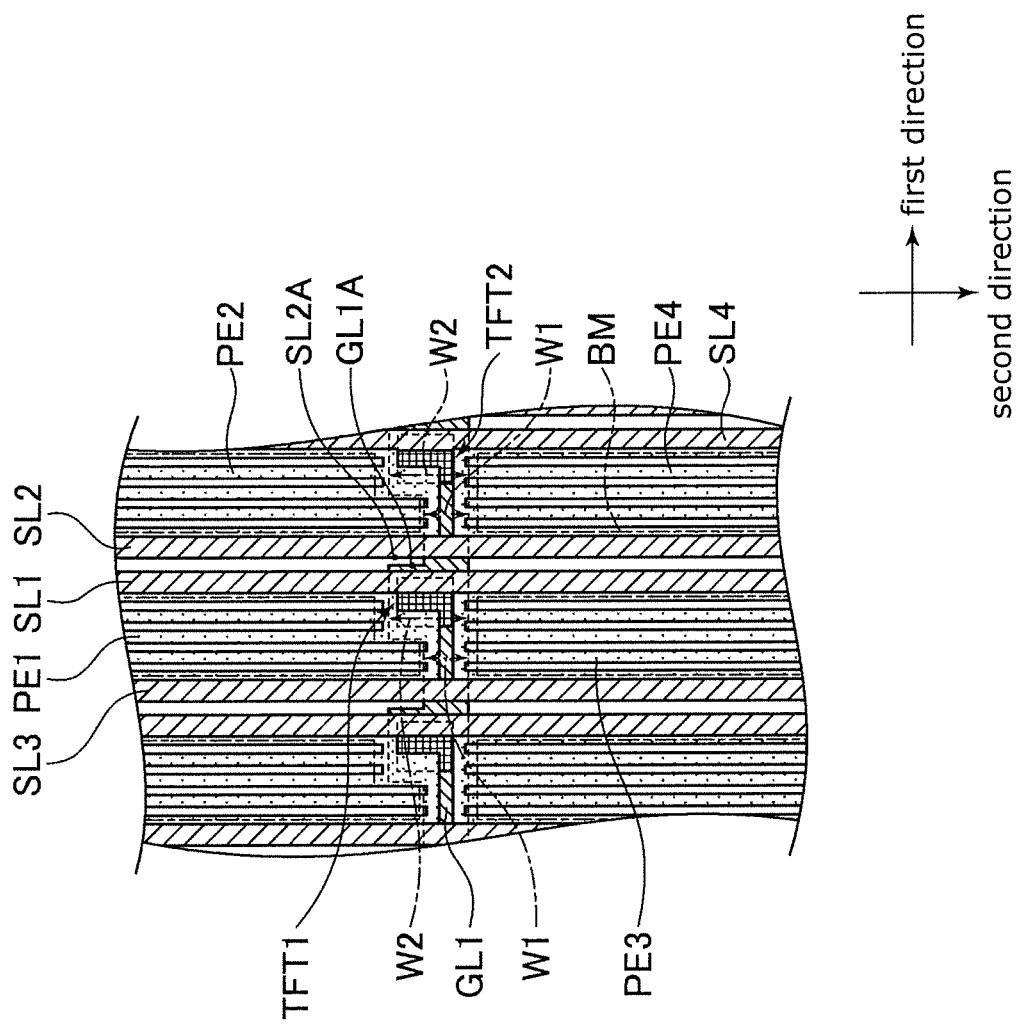
FIG. 5 is a schematic plan view illustrating the arrangement relationship between pixel electrodes and a spacer according to a reference example of a first exemplary embodiment.

In the reference example illustrated in FIG. 5, the second pixel electrode PE2 is connected to the fourth source line SL4 instead of the second source line SL2. As such, in order to achieve a configuration that does not reduce the aperture ratio, the width of the first gate line GL1 in the second direction in the region, between the second pixel electrode PE2 and the fourth pixel electrode PE4, that does not overlap with the second thin film transistor TFT2 when viewed from above, must be set to the first width W1 that is smaller than the width (for example, the second width W2) of the region that overlaps with the first thin film transistor TFT1 and the second thin film transistor TFT2 when viewed from above.

With such a configuration, when measuring the width of the first gate line GL1 in the second direction from between the first pixel electrode PE1 and the third pixel electrode PE3 to between the second pixel electrode PE2 and the fourth pixel electrode PE4, the first gate line GL1 has the first width W1 that is smaller than the second width W2 in the region, between the first pixel electrode PE1 and the third pixel electrode PE3, that does not overlap with the first thin film transistor TFT1 when viewed from above, and the second width W2 that is larger than the first width W1 in the region that overlaps with the first thin film transistor TFT1 when viewed from above. Moreover, the first gate line GL1 has the first width W1 that is smaller than the second width W2 in the region, between the second pixel electrode PE2 and the fourth pixel electrode PE4, that does not overlap with the second thin film transistor TFT2 when viewed from above, and the second width W2 that is larger than the first width W1 in the region that overlaps with the second thin film transistor TFT2 when viewed from above.

With such a configuration, the width of the first gate line GL1 in the second direction decreases twice from between the first pixel electrode PE1 and the third pixel electrode PE3 to between the second pixel electrode PE2 to the fourth pixel electrode PE4. That is, the width of the first gate line GL1 becomes the first width W1. As such, the resistance of the first gate line GL1 may increase.

In contrast, with the configuration illustrated in FIG. 4, the second pixel electrode PE2 is connected to the second source line SL2. As a result, the first gate line GL1 can be provided with a continuous width (for example, the width W2) in the second direction that is larger than the first width W1, from the region that overlaps with the first thin film transistor TFT1 when viewed from above to the region that overlaps with the second thin film transistor TFT2 when viewed from above. As a result of this configuration, it is possible to lower the resistance of the first gate line GL1.

Note that a configuration is possible in which the width (for example, the second width W2) of the first gate line GL1 is not constant from the region that overlaps with the first thin film transistor TFT1 when viewed from above to the region that overlaps with the second thin film transistor TFT2 when viewed from above. That is, the advantageous effects described above can be obtained provided that the width of the first gate line GL1 in the second direction from the region that overlaps with the first thin film transistor TFT1 when viewed from above to the region that overlaps with the second thin film transistor TFT2 when viewed from above is larger than the first width W1 of the region, between the first pixel electrode PE1 and the third pixel electrode PE3, that does not overlap with the first thin film transistor TFT1 when viewed from above.

Furthermore, with the configuration illustrated in FIG. 4, it is possible to suppress the generation of parasitic capacitance between the side surface of the second source line SL2 and the side surface of the first gate line GL1. With the configuration of the reference example illustrated in FIG. 5, a portion GL1A of the side surface of the first gate line GL1 and a portion SL2A of the side surface of the second source line SL2 face each other when viewed from above. As such, parasitic capacitance is generated between these two portions.

In contrast, with the configuration illustrated in FIG. 4, the first gate line GL1 has a width in the second direction larger than the first width W1 from the region that overlaps with the first thin film transistor TFT1 when viewed from above to the region that overlaps with the second thin film transistor TFT2 when viewed from above. As such, when viewed from above, the region in which the portion GL1A of the side surface of the first gate line GL1 and the portion SL2A of the side surface of the second source line SL2 face each other can be eliminated or reduced. As a result, the generation of parasitic capacitance can be suppressed.

FIG. 2 is a schematic cross-sectional view illustrating a cross-section, taken along the first direction, of a region in which the spacer PS illustrated in FIG. 4 is disposed. The display panel 200 includes the thin film transistor substrate 230 that is disposed on aback surface side of the display panel 200, the counter substrate 240 that is disposed on a display surface side of the display panel 200 and that faces the thin film transistor substrate 230, and the liquid crystal layer 250 that is sandwiched between the thin film transistor substrate 230 and the counter substrate 240. The spacer PS is configured to project from the back surface side of the counter substrate 240 to the thin film transistor substrate 230 side.

The thin film transistor substrate 230 includes a glass substrate 231, the first gate line GL1 that is formed on the display surface side of the glass substrate 231, and a gate insulating film 237 that covers the first gate line GL1. A first semiconductor layer SEM1 that constitutes a part of the first thin film transistor TFT1 and a second semiconductor layer SEM2 that constitutes a part of the second thin film transistor TFT2 are formed on the display surface side of the gate insulating film 237. The first source line SL1 and a first source electrode SM1 are formed on the display surface side of the first semiconductor layer SEM1, and the second source line SL2 and a second source electrode SM2 are formed on the display surface side of the second semiconductor layer SEM2.

An insulating film 233 is formed on the display surface side of the gate insulating film 237 so as to cover the first semiconductor layer SEM1, the first source line SL1, the first source electrode SM1, the second semiconductor layer SEM2, the second source line SL2, and the second source electrode SM2. An insulating film 234 is formed on the display surface side of the insulating film 233, and the first pixel electrode PE1 and the second pixel electrode PE2 are formed on the display surface side of the insulating film 234. The first pixel electrode PE1 and the second pixel electrode PE2 are respectively connected to the first source electrode SM1 and the second source electrode SM2 via openings of common electrodes (not illustrated in the drawings) by penetrating through portions of the insulating film 234 and the insulating film 233. An alignment film 235 is formed on the display surface side of the insulating film 234, the first pixel electrode PE1, and the second pixel electrode PE2. A polarizer 236 is formed on the back surface side of the glass substrate 231.

The counter substrate 240 includes the black matrix BM that is formed on a glass substrate 241. The black matrix BM is disposed so as to overlap the first semiconductor layer SEM1, the second semiconductor layer SEM2, the spacer PS, and the first gate line GL1 when viewed from above. As such, the black matrix BM is formed continuously from the region in which the first semiconductor layer SEM1 is formed to the region in which the second semiconductor layer SEM2 is formed. Furthermore, the counter substrate 240 includes an overcoat film 242 provided so as to cover the back surface side of the black matrix BM and a color filter (not illustrated in the drawings), and an alignment film 243 provided on the back surface side of the overcoat film 242. A polarizer 244 is formed on the display surface side of the glass substrate 241.

As a result of this configuration, a reduction of the aperture ratio can be suppressed and, at the same time, a spacer PS with a size sufficient to straddle the positions at which the first semiconductor layer SEM1 and the second semiconductor layer SEM2 are disposed can be provided, and display inconsistencies can be suppressed.

Embodiments of the present invention are described above, but the present invention should not be construed to be limited to these embodiments. It goes without saying that modifications from the embodiments described above that are appropriately implemented by a person skilled in the art and that do not depart from the spirit of the present invention are also included in the technical scope of the present invention.

What is claimed is:

1. A liquid crystal display device, comprising:
   a first substrate;
   a second substrate disposed so as to face the first substrate;
   a liquid crystal layer disposed between the first substrate and the second substrate; and
   a spacer maintaining a gap between the first substrate and the second substrate; wherein the first substrate includes
      a first pixel row including a first pixel electrode and a second pixel electrode that are arranged in a first direction,
      a second pixel row including a third pixel electrode and a fourth pixel electrode that are arranged in the first direction, the second pixel row being adjacent to the first pixel row in a second direction that crosses the first direction,
      a first source line and a second source line that extend in the second direction between the first pixel electrode and the second pixel electrode, and between the third pixel electrode and the fourth pixel electrode,
      a first gate line that extends in the first direction between the first pixel row and the second pixel row,
      a first thin film transistor to which the first source line, the first gate line, and the first pixel electrode are electrically connected, and
      a second thin film transistor to which the second source line, the first gate line, and the second pixel electrode are electrically connected,
   the spacer is disposed so as to overlap with at least a portion of the first thin film transistor and at least a portion of the second thin film transistor in plan view,
   the first gate line has a first width in the second direction in a region between the first pixel electrode and the third pixel electrode, that does not overlap with the first thin film transistor in plan view, and a second width in the second direction in a region between the first thin film transistor and the second thin film transistor, that overlaps with the spacer in plan view, and
   the second width of the first gate line in the entire region between the first thin film transistor and the second thin film transistor is larger than the first width.

2. The liquid crystal display device according to claim 1, further comprising:
   a third pixel row including a fifth pixel electrode and a sixth pixel electrode that are arranged in the first direction, the third pixel row being adjacent to the second pixel row in the second direction; and
   a second gate line that extends in the first direction between the second pixel row and the third pixel row; wherein
   the first source line and the second source line extend in the second direction between the fifth pixel electrode and the sixth pixel electrode.

3. The liquid crystal display device according to claim 2, further comprising:
   a first end connection wiring that connects the first gate line to the second gate line at an end portion of the second pixel row; wherein
   a common gate signal is supplied to the first gate line and the second gate line via the first end connection wiring.

4. The liquid crystal display device according to claim 2, further comprising:
   a third source line disposed so as to sandwich, together with the first source line, the first pixel electrode and the third pixel electrode;
   a fourth source line disposed so as to sandwich, together with the second source line, the second pixel electrode and the fourth pixel electrode;
   a third thin film transistor to which the third source line, the second gate line, and the third pixel electrode are electrically connected; and
   a fourth thin film transistor to which the fourth source line, the second gate line, and the fourth pixel electrode are electrically connected.

5. The liquid crystal display device according to claim 1, wherein:
   the counter substrate includes a black matrix, and
   the black matrix is disposed so as to overlap with at least a portion of the first thin film transistor, at least a portion of the second thin film transistor, and the spacer in plan view.

6. The liquid crystal display device according to claim 1, wherein:
   the first source line is disposed at a position closer to the first pixel electrode than the second source line, and
   the second source line is disposed at a position closer to the second pixel electrode than the first source line.

7. A liquid crystal display device, comprising:
   a first substrate;
   a second substrate disposed so as to face the first substrate;
   a liquid crystal layer disposed between the first substrate and the second substrate; and
   a spacer maintaining a gap between the first substrate and the second substrate; wherein
   the first substrate includes
      a first pixel row including a first pixel electrode and a second pixel electrode that are arranged in a first direction,
      a second pixel row including a third pixel electrode and a fourth pixel electrode that are arranged in the first direction, the second pixel row being adjacent to the first pixel row in a second direction that crosses the first direction, a first source line and a second source line that extend in the second direction between the first pixel electrode and the second pixel electrode, and between the third pixel electrode and the fourth pixel electrode, a first gate line that extends in the first direction between the first pixel row and the second pixel row, having a first width in the second direction in a region between the first pixel electrode and the third pixel electrode, that does not overlap with the first thin film transistor in plan view, a first thin film transistor to which the first source line, the first gate line, and the first pixel electrode are electrically connected, and a second thin film transistor to which the second source line, the first gate line, and the second pixel electrode are electrically connected, the spacer is disposed so as to overlap with at least a portion of the first thin film transistor and at least a portion of the second thin film transistor in plan view, and the first gate line has a continuous width in the second direction larger than the first width from a region that overlaps with the first thin film transistor to a region that overlaps with the second thin film transistor in plan view.

\* \* \* \* \*